(12) United States Patent
Boutet et al.

(10) Patent No.: US 10,664,713 B2
(45) Date of Patent: May 26, 2020

(54) METHOD AND SYSTEM FOR ACQUIRING AND ANALYSING FINGERPRINTS WITH FRAUD DETECTION

(71) Applicants: Commissariat A L'Energie Atomique et Aux Energies Alternatives, Paris (FR); Safran, Paris (FR)

(72) Inventors: Jérôme Boutet, Claix (FR); Joël-Yann Fourre, Marly le Roi (FR)

(73) Assignees: COMMISSARIAT A L'ENERGIE ATOMIQUE ET AUX ENERGIES ALTERNATIVES, Paris (FR); SAFRAN, Paris (FR)

( * ) Notice: Subject to any disclaimer, the term of this patent is extended or adjusted under 35 U.S.C. 154(b) by 274 days.

(21) Appl. No.: 15/538,425

(22) PCT Filed: Dec. 18, 2015

(86) PCT No.: PCT/FR2015/053643
§ 371 (c)(1),
(2) Date: Jul. 13, 2017

(87) PCT Pub. No.: WO2016/102854
PCT Pub. Date: Jun. 30, 2016

(65) Prior Publication Data
US 2018/0032827 A1    Feb. 1, 2018

(30) Foreign Application Priority Data

Dec. 22, 2014   (FR) ...................... 14 63100

(51) Int. Cl.
*G06K 9/00* (2006.01)

(52) U.S. Cl.
CPC ....... *G06K 9/00906* (2013.01); *G06K 9/0012* (2013.01); *G06K 9/00013* (2013.01); *G06K 9/00087* (2013.01)

(58) Field of Classification Search
None
See application file for complete search history.

(56) References Cited

U.S. PATENT DOCUMENTS

| | | | | |
|---|---|---|---|---|
| 7,801,339 B2 * | 9/2010 | Sidlauskas | ........... | G06K 9/0012 340/5.53 |
| 2008/0253625 A1 * | 10/2008 | Schuckers | .......... | G06K 9/00114 382/125 |
| 2012/0321149 A1 * | 12/2012 | Carver | ................. | G06K 9/0004 382/124 |
| 2014/0037158 A1 * | 2/2014 | McNulty | ............ | G06K 9/00013 382/125 |

* cited by examiner

*Primary Examiner* — Leon Viet Q Nguyen
(74) *Attorney, Agent, or Firm* — Brinks Gilson & Lione (57) ABSTRACT

A method and system for acquiring and analyzing fingerprints with fraud detection in which an image of a fingerprint of an object is formed and the object is irradiated by means of an energizing beam. A fluorescence emitted by the object in response to the energizing beam is analyzed and a validity criterion is established from the analysis of fluorescence and making it possible to discriminate biological tissue from other objects is verified. A region of interest, capable of characterizing the biological tissues is selected on the fingerprint image, where the region of interest defines a useful observation area on the object by correspondence, and the validity criterion is established from measurements of fluorescence intensity relative to the observation area only.

15 Claims, 5 Drawing Sheets

METHOD AND SYSTEM FOR ACQUIRING AND ANALYSING FINGERPRINTS WITH FRAUD DETECTION

RELATED APPLICATIONS

This application is a 371 nationalization of PCT Application No. PCTFR2015053643, which claims priority to French Patent Application No. 1463100, all of which are incorporated by reference herein.

TECHNICAL FIELD

The invention relates to the technical field of biometry and more particularly of acquiring and analyzing finger or palm prints. Throughout the description, in the interest of simplicity, the object of which the print is to be analyzed is often assimilated to a finger, without this being limiting: it could be a set of several fingers, the palm of one hand, a whole hand or any other analogous object.

BACKGROUND

Some optical systems for print acquisition use the principle of frustrated total internal reflection in order to produce images of very high contrast. The finger (or other object to analyze) is then place on a prism or slide with an inclined face. The print acquisition system is furthermore provided with an illumination means and with an imaging system. Two arrangements are possible: bright-field and dark-field.

Other types of sensor have been developed: sensors with "face-on" imaging, such as that disclosed by European Patent Application No. EP1789908; contactless sensors such as those described in French Patent Application No. FR2927713 or PCT Pub. No. WO201490750, and flat contact sensors (TFT).

Whatever the technique used, spoofing means have been developed, among which is the use of finger moldings (or moldings of the object to analyze). These moldings may be made from various materials, which are generally available in all DIY stores or hobby stores, such as latex or silicone. It is also known, as a spoofing means, to use a print-out of the print on a sheet of paper.

The purpose of the acquisition of a print is to compare the acquired print with one or more images stored in a database and, in case of match, to authenticate or identify the carrier. This serves in particular to give a right such as an access right, a signature right, or a right to use a system, etc. Spoof detection makes it possible, automatically, not to identify or authenticate a person who presents a replica to the sensor.

To fulfill this function, several techniques are possible.

PCT Pub. No. WO2006/082550 proposes to use the acquisition of a fluorescence spectrum, either to verify the presence in the object analyzed of one or more fluorophores that are native, that is to say which are naturally present in the human body (collagen tryptophan, etc.) if is solely a matter of eliminating the risk of being in the presence of a synthetic replica, or to verify the match between the acquired fluorescence spectrum and a reference fluorescence spectrum if it is a matter of authenticating a person whose identity is presupposed. The technique proposed by PCT Pub. No. WO2006/082550 requires the use of a spectrometer that is sufficiently energy resolving, which is an additional burden on the manufacturing cost of the print acquiring system. Furthermore, the spectrometry analysis increases the processing time for the print, which may generate an undesirable queue.

The use of native fluorescence to detect a living finger in the context of print measurement is also disclosed by U.S. Patent Pub. No. 20140037158, which describes a system measuring the fluorescence of sweat induced by an electromagnetic field. In this patent, the sensor causes an electric current to pass in the finger to stimulate the production of sweat and localize the position of the pores by fluorescence. This patent assumes that the position of the pores, located by fluorescence induced by an electromagnetic field, may be considered as biometric data enabling a subject to be authenticated in relation to the presupposed identity.

The invention disclosed by U.S. Patent Pub. No. 20140037158 has in particular the following drawbacks:
the imaging of the pores and locating them require a high-resolution sensor, which burdens the cost of the final system;
the process of inducing the sweat requires more than a second to work, which is detrimental to the ergonomics of the device. As a matter of fact, most print sensors have to operate in less than a second to avoid queues at the locations where they are installed.

SUMMARY

The invention is directed to mitigating the aforementioned drawbacks by providing a system for acquiring and analyzing prints including means for spoof detection by discriminating biological tissues relative to other objects, that are compatible with most known print sensors (total internal reflection sensors but also TFT flat sensors). The integration of spoof detection means according to the invention in a known system for acquiring and analyzing prints must not require substantial modifications to the latter.

Another objective of the invention is to provide a new system for acquiring and analyzing prints with spoof detection, which is less costly, less bulky, painless for the user, and capable of analyzing a print and evaluating the risks of spoof within a processing time of the order of the second.

To that end, the invention uses the analysis of native fluorescence (without marking) of biological tissues as a liveness indicator, but in a different and simplified way relative to PCT Pub. No. WO2006/082550. More specifically, the invention provides a method of acquiring and analyzing prints with spoof detection, comprising the following steps:
forming a print image of an object placed facing a transparent reception surface (preferably, the object is placed on the transparent reception surface) which print image is representative of microstructure of a surface of the object (referred to as a visible surface of the object) which is visible through the transparent reception surface;
irradiating the object with an excitation beam according to an excitation spectral band;
analyzing a fluorescence emitted by the object in response to the excitation beam, according to a fluorescence spectral band;
verifying a validity criterion enabling biological tissues to be discriminated relative to other objects, which validity criterion is established on the basis of the fluorescence analysis.

The method according to the invention is characterized in that:
the step of analyzing fluorescence comprises acquiring fluorescence intensity measurements over the whole visible surface of the object and forming a fluorescence image of the object, it further comprises a step of selecting a region of interest in the print image, which region of interest is suitable for characterizing the biological tissues; this region of interest defines (that is to say corresponds to) a zone on the visible surface of the object, which below is called the useful observation zone of the object, the validity criterion is established solely on the basis of the fluorescence intensity measurements which are relative to the useful observation zone of the object.

The invention also provides a device for implementing of the method according to the invention, and in particular a system for acquiring and analyzing prints with spoof detection, comprising:

a transparent reception surface;

a detector for the formation of a print image of an object placed facing the transparent reception surface, which print image is representative of microstructure of a visible surface of the object; it may for example be a photodetector or a capacitive detector or for instance a fluorescence imaging device;

an excitation light source suitable for producing an excitation beam directed towards the object, according to a excitation spectral band, a fluorescence detector for analyzing a fluorescence emitted by the object in response to the excitation beam, according to a fluorescence spectral band;

a calculator for verifying a validity criterion enabling biological tissues to be discriminated from other objects, which validity criterion is established on the basis of the fluorescence analysis.

The system for acquiring and analyzing prints according to the invention is characterized in that the fluorescence detector is suitable for acquiring fluorescence intensity measurements over the whole of the visible surface of the object and of forming a fluorescence image of the object, and in that the calculator is configured for:

selecting a region of interest in the print image, which region of interest is suitable for characterizing the biological tissues, the region of interest defining through correspondence, on the object, a zone referred to as useful observation zone, establishing the validity criterion solely on the basis of the fluorescence intensity measurements which are relative to the useful observation zone of the object.

Contrary to PCT Pub. No. WO2006/082550, the fluorescence analysis carried out in the method according to the invention is not directed at determining the nature of the fluorophores and thus of the material constituting of the object to analyze, but simply whether or not it belongs to the set comprising biological tissues. The inventors have indeed established that fluorescence intensity measurements are sufficient to establish such a validity criterion provided that these intensity measurements are carried out in a useful observation zone of the object correctly selected using the print image.

Whereas in PCT Pub. No. WO2006/082550 the fluorescence analysis relates to the entire visible surface of the object, in the invention the fluorescence analysis only concerns a smaller zone (useful observation zone of the object) which really carries information. This useful observation zone of the object is defined on the basis of the selection in the print image of a region of interest. Three alternative principles are provided below for selecting a region of interest.

Moreover, only the levels (or intensities) of fluorescence are measured in the method according to the invention whereas the method of PCT Pub. No. WO2006/082550 requires fluorescence spectra to be established.

All these differences lead to the response time of a system according to the invention being shorter than that of PCT Pub. No. WO2006/082550. It follows from this too that it is possible to use a simpler and cheaper fluorescence detector in a system according to the invention. It is also possible to transform with ease any known system for acquiring and analyzing prints into a system according to the invention, it being possible for the detector used for forming the print image to be of any type, it being noted that it is not judicious to use the known systems for acquiring and analyzing prints that have a detector provided with spectral analysis means, the response times of which may be judged too long.

In a first version of the invention:

the region of interest (in the print image) is selected such that the corresponding useful observation zone of the object is a peak zone in contact with the transparent reception surface; In this first version, the object is thus placed on the transparent reception surface. In the corresponding system for capturing and analyzing prints, the calculator is configured so as to select such a region of interest;

and the verification of the validity criterion comprises calculating an average or a sum of the fluorescence intensities measured for the useful observation zone of the object and comparing that mean or sum with a predetermined window of fluorescence intensities corresponding to biological tissues. In the corresponding system for acquiring and analyzing prints, the calculator is configured to calculate an average or sum of the fluorescence intensities measured in the useful observation zone of the object and to compare that average or sum with a predetermined window of fluorescence intensities corresponding to biological tissues.

It is to be noted that only the fluorescence intensity measurements obtained for the useful observation zone of the object are necessary for determining the validity criterion according to the invention. However, in practice, it is simpler and no doubt faster to form a fluorescence image of the whole of the visible surface of the object and then to exploit only a part (here called region of interest in the fluorescence image) corresponding to the useful observation zone of the object. Selecting the region of interest in the print image may thus be carried out prior to or subsequent to acquiring the fluorescence intensity measurements.

By concentrating the analysis of the fluorescence image on parts of the finger that are actually in contact with the transparent surface, a much more robust fluorescence signal is obtained and therefore a more reliable response. Furthermore, the fluorescence signal may be normalized relative to the useful observation zone of the object. A surface fluorescence intensity may thus be obtained for the object/transparent reception surface contact zones. The surface fluorescence intensity of the zones without contact is not used by the invention in this first version.

Figure 1:
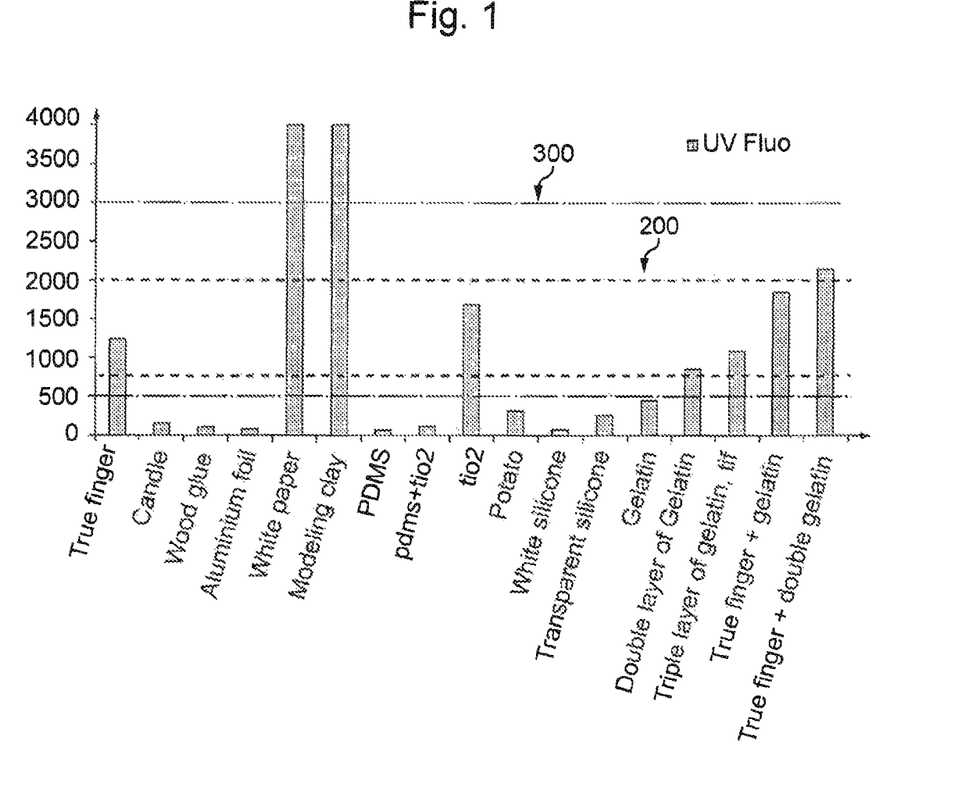
FIG. 1 is a graph representing the level of fluorescence (number of photons detected, along the y-axis) of several objects (along the x-axis) among which are true fingers and replicas.

The possibility, brought to light by the inventors, of characterizing biological tissues by fluorescence intensity measurements over a useful observation zone of the object corresponding to a peak zone in contact with the transparent reception surface is illustrated in FIG. 1 appended hereto. The studies by the inventors have moreover made it possible to evaluate that the fluorescence signal could vary from one individual to another with a standard deviation of 30% maximum. This standard deviation corresponds to a range of fluorescence intensities 200 delimited by the dashed line in FIG. 1 (i.e. approximately the range [800; 2000]. If, as validity window, the window referenced 300 and corresponding to the intensities [500; 3000] is defined, then the biological tissues of the whole of the population here are considered as valid and the window so selected enables the rejection of spoofs by use of replicas of white paper and modelling clay, of which the fluorescence intensity is greater than 3000, as well as of spoofs by the use of replicas made of candle, wood glue, aluminum foil, potato, PDMS, silicone and gelatin, of which the fluorescence intensity is less than 500.

Preferably, the validity window is adjusted according to the population of the users of the system for acquiring and analyzing prints. The lower and upper bounds of the validity window may indeed be learned by collecting measurements on a sample which is varied and representative of the population of the users of the system.

The validity window may also be adjusted on the basis of a desired degree of security, depending on whether it is desired to enhance the security, at the price of rejecting a few authentic fingers, or to promote the ergonomics of the system and accept all authentic fingers, at the price of allowing a few spoofs to pass.

In a second version of the invention:
  the excitation beam has a spectral band centered on a wavelength situated in the ultraviolet and forms a pattern (for example a point or a disk, a dash, a square or several of these shapes, etc.), here called excitation pattern, on the visible surface of the object; in the whole of the application, the term "ultraviolet" is used as a misnomer to designate the wavelengths comprised between 100 nm and 450 nm (it thus also comprises the range [380; 450] generally classified in the visible range—violet—); preferably, the central wavelength of the excitation spectral band is moreover greater than 280 nm, that is to say situated outside the UV-C range (it is thus between 280 nm and 450 nm);
  the region of interest is selected such that the corresponding useful observation zone (of the object) has no intersection with that excitation pattern and is situated at a predetermined distance from the excitation pattern which is both the shortest possible and sufficient for the fluorescence measurements of that zone not to be perturbed by back-scattering of the excitation beam. In the corresponding system, the excitation light source has a spectral band centered on a wavelength less than 450 nm (that is to say in the ultra-violet as meant by the present application) and is configured such that the excitation beam forms an excitation pattern on the visible surface of the object, and the calculator is configured to select, as region of interest, a region corresponding (on the object) to a useful observation zone not having an intersection with that excitation pattern and which is situated at a predetermined distance from the excitation pattern which is both the shortest possible and sufficient for the fluorescence measurements of that zone to be considered as not (or little) perturbed by back-scattering of the excitation beam; in practice, this predetermined distance advantageously corresponds to the distance starting at which the ratio between the intensity of a back-scattering of the excitation beam and the intensity of a fluorescence beam becomes less than 1, that is to say the distance starting at which the intensity of the back-scattered excitation beam becomes smaller than the intensity of a fluorescence beam;
  furthermore, the verification of the validity criterion comprises comparing an average of the fluorescence intensity measurements obtained for the useful observation zone with a predetermined validity window corresponding to biological tissues.

In a possible variant of this second version of the invention:
  here too, the excitation beam has a spectral band in the ultra-violet (i.e. centered on a wavelength less than 450 nm) and forms an excitation pattern on the visible surface of the object;
  the region of interest is selected so as to correspond to at least two useful observation zones on the object not having any intersection with that excitation pattern, i.e. a first useful observation zone situated at a first predetermined distance from the excitation pattern, which first distance advantageously corresponds to the distance at which the ratio between the intensity of a back-scattering of the excitation beam and the intensity of a fluorescence beam is equal to 1, and a second useful observation zone situated at a second predetermined distance from the excitation pattern, the second distance being greater than the first distance (at this second distance, the intensity of the fluorescence beam is thus strictly greater than, and preferably much greater than, the intensity of the back-scattered excitation beam; it is to be noted that the first useful observation zone and the second useful observation zone are not necessarily situated on a same side as, or aligned with, the excitation pattern;
  the verification of the validity criterion comprises establishing a fluorescence decrease profile according to the distance relative to the excitation pattern, using the fluorescence intensities measured for the first and second useful observation zones (which are situated at different distances from the excitation pattern), and comparing a slope of that decrease profile with a predetermined validity window for fluorescence decrease profile slopes corresponding to biological tissues. The fluorescence signal analyzed thus combines information on fluorescence intensity and absorption/scatter information. By analyzing the decrease profile, it is possible more or less to separate these two items of information, and thus enable greater relevance in the discrimination.

This variant may be combined with the variant already described of the second version of the invention, as follows: selection of at least two useful observation zones at different distances; comparison of the fluorescence intensity measured for the first useful observation zone with a first predetermined validity window (window of intensities); comparing a fluorescence decrease profile slope obtained from the two useful observation zones with a second predetermined validity window (slopes window). The combination enables the discrimination to be refined still further.

In this second version, analysis is made, beyond the intensity of the fluorescence signal, of the attenuation of that signal in the finger progressively on moving away from the excitation pattern. The inventors have shown that this attenuation could constitute a signature of the material constituting the finger analyzed.

The comments made concerning the validity window defined in the first version of the invention (possibility of adjusting the window according to the degree of security desired or according to the population of users intended) apply in the same way to the various validity windows defined above in the second version of the invention.

In a third version of the invention applicable to a system for acquiring and analyzing prints for which the detector for forming the print image is a TFT sensor (for which radiation coming from the valley zones is captured by the detector, as explained later), the region of interest (in the print image) is selected such that the corresponding useful observation zone of the object is a zone of valleys (such a zone of valleys is not in contact with the transparent reception surface). In like manner to the first version of the invention, a validity window is defined in advance, by measuring the fluorescence emitted by an equivalent zone of various replicas and true fingers, and the verification of the validity criterion consists of comparing the measured fluorescence for the useful observation zone of the object to analyze with that validity window, which window may be adjusted as explained above.

The use of a zone of valleys as a useful observation zone in the case of a TFT sensor has the advantage that the fluorescence measurements depend less on the optical coupling between the skin and the transparent reception surface and are not therefore degraded for dry fingers. As a matter of fact, for fingers that are too dry, it is to be noted that there are few points of contact between the finger and the transparent reception surface, therefore a useful observation zone limited to one contact zone has low representativeness since it is insufficiently extensive.

Both in the first and in the second version of the invention, the print image may be formed from measurements of radiation reflected and/or back-scattered by the object. In the third version it is essentially back-scattered radiation since the use of a TFT sensor is required. In this case, forming the print image comprises irradiating of the object through the transparent reception surface using an illumination beam, according to an illumination spectral band, and measuring a reflecting beam or a beam transmitted by the object. The corresponding system comprises an illumination source emitting an illumination beam irradiating the object through the transparent reception surface, according to an illumination spectral band, and the detector for forming the print image is chosen from: a dark-field or light-field total internal reflection sensor configured to measure a beam reflected by the object; a TFT sensor. In the second version of the invention, it is also possible to use a contactless sensor as detector for forming the print image.

As a variant, the print image is a fluorescence image, the print image then preferably being one and the same image, and forming the print image and acquiring the fluorescence measurements constitute one and the same operation carried out using a fluorescence imaging device. This variant is compatible with the first two versions of the invention. The corresponding system comprises a fluorescence imaging device which serves both as detector for forming the print image, which is then a fluorescence image, and as fluorescence detector for analyzing a fluorescence emitted by the object.

This variant has the advantage of only using one sensor for forming the print image and detecting the spoof by measuring fluorescence. This embodiment is thus particularly simple, compact and cheap. It is to be noted that all versions, variants etc. of the invention may be produced with a single sensor, in the interest of economy, simplicity and compactness. This is precisely one of the advantages of the invention. The embodiment with a fluorescence imaging device furthermore requires lower calculation power. It is moreover particularly rapid when a single acquisition operation suffices to perform all functions.

In a possible embodiment of the invention, the excitation spectral band (for the fluorescence) is entirely under 500 nm. This makes it possible to obtain higher fluorescence intensities and better differentiation between biological tissues and other materials. As explained in the following paragraph, this also enables the use of a lower-performance (and thus cheaper) material for equivalent results.

In a conventional manner, the fluorescence detector is associated with a filter, which will be called fluorescence detection filter here, configured to exclude the excitation spectral band from the rays transmitted to the detector material, in order to avoid the fluorescence detector being blinded by the excitation beam back-scattered by the object. As a matter of fact, the quantum efficiency of detection by the known fluorescence detectors is low in the ultra-violet.

By using an excitation spectral band in the ultraviolet, advantage is taken of the fact that the detector is not very sensitive to the excitation wavelength (UV) and that it is much more sensitive to the fluorescence wavelength. The level of requirement for the fluorescence detection filter is thus lowered: a filter of optical density of 3 or even 2 is sufficient; it is not necessary to use a filter of which the optical density attains 5 or 6, which is much more costly.

In a possible embodiment of the invention, the steps of analyzing fluorescence and verifying the validity criterion are repeated with different excitation beams of which the excitation spectral bands are centered on different wavelengths, for example 375 nm, 405 nm and 450 nm. In this example, the three excitation wavelengths chosen are all less than 500 nm for the reasons indicated above. However, this does not exclude the possibility of using at least one excitation beam centered on a wavelength greater than 500 nm.

The corresponding system for acquiring and analyzing prints then comprises a plurality of excitation sources, and more specifically as many excitation sources as desired excitation beams.

In a possible embodiment of the invention, a background measuring step is carried out, in which measurements of fluorescence intensities, called fluorescence measurements without specific excitation below, are carried out, according to the fluorescence spectral band but in the absence of a excitation beam. The fluorescence measurements without specific excitation obtained for the useful observation zone of the object are next subtracted from the fluorescence intensity measurements obtained for that zone in response to the excitation beam. This addition step in particular makes it possible to make the system robust to the ambient light transmitted through the object and thereby improve the signal-to-noise ratio.

Figure 6:
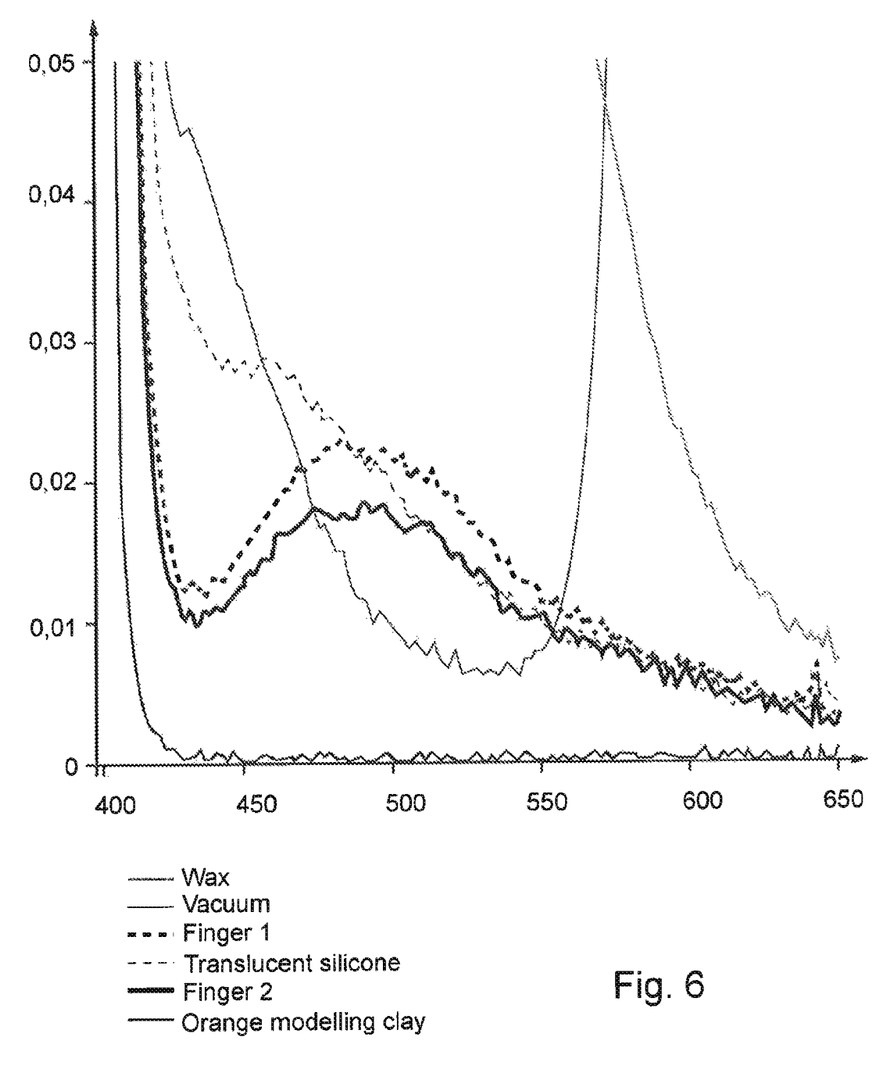
FIG. 6 is a graph representing fluorescence spectra for various objects among which are true fingers and replicas.

In a possible embodiment of the invention, an additional discrimination step is carried out, this step using intensity measurements of the fluorescence emitted in the blue by the useful observation zone of the object in response to the excitation beam. This additional discrimination step may comprise:

comparing an average or sum of these measurements of fluorescence intensity in the blue with a maximum threshold for fluorescence in the blue. The inventors have indeed established that biological tissues presented a low emission of fluorescence in the blue, which is a characteristic not present in the materials usually used to create replicas, as illustrated in FIG. 6 in the case of an excitation beam centered on 405 nm (a narrow valley can be noted around 430 nm in the emission spectrum for true fingers);

and/or comparing, with a maximum ratio determined in advance, a ratio between the average intensity of the fluorescence in the blue and the average intensity of the fluorescence in another spectral band, for example in the green, emitted by the useful observation zone. It is possible for example to use a color camera to then analyze the blue part in the fluorescence signal By using the usual colored filters for this type of sensor, decomposition into three bands (red, green and blue) of the fluorescence signal is obtained. The ratios between the responses over these three bands (which corresponds to the color in the usual sense of the term and may therefore extend to any other representation of the color such as a, b, in the L, a, b space or for instance Cr, Cb, in the Y, Cr, Cb space) are representative of the fluorophores of the object and may be used for an additional discrimination step.

The low emission in the blue of the fluorophores of biological tissues may thus be controlled to eliminate certain spoofs which would have escaped all control made by verification of the validity criterion according to the invention. The objects of which the fluorescence intensity measured in the blue is greater than the maximum threshold for fluorescence in the blue defined above and/or of which the blue/other spectral band is greater than the aforementioned maximum ratio, are considered as invalid and are rejected.

The invention extends to a method and to a system for acquiring and analyzing prints with spoof detection, characterized in combination by all or some of the features mentioned above and below.

BRIEF DESCRIPTION OF THE DRAWING

Other details and advantages of the present invention will appear from the reading of the following description, which refers to the diagrammatic appended drawings and which relates to preferred embodiments, provided by way of non-limiting examples. In these drawings:

FIG. 2 illustrates a first part of the method according to the invention, while FIG. 3 illustrates a second part of this method.

DETAILED DESCRIPTION

Figure 2:
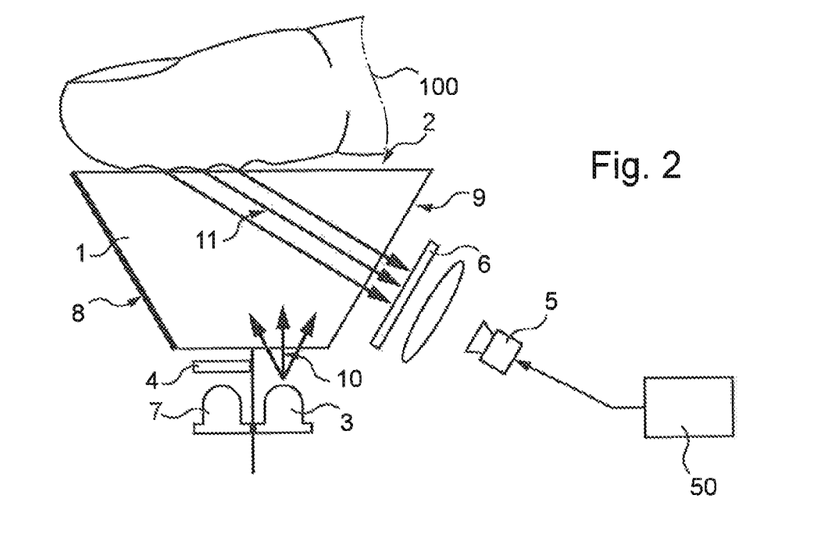
FIGS. 2 and 3 are diagrammatic views in elevation of a first embodiment of a system for acquiring and analyzing prints according to the invention, with a dark-field total internal reflection sensor.
Figure 3:
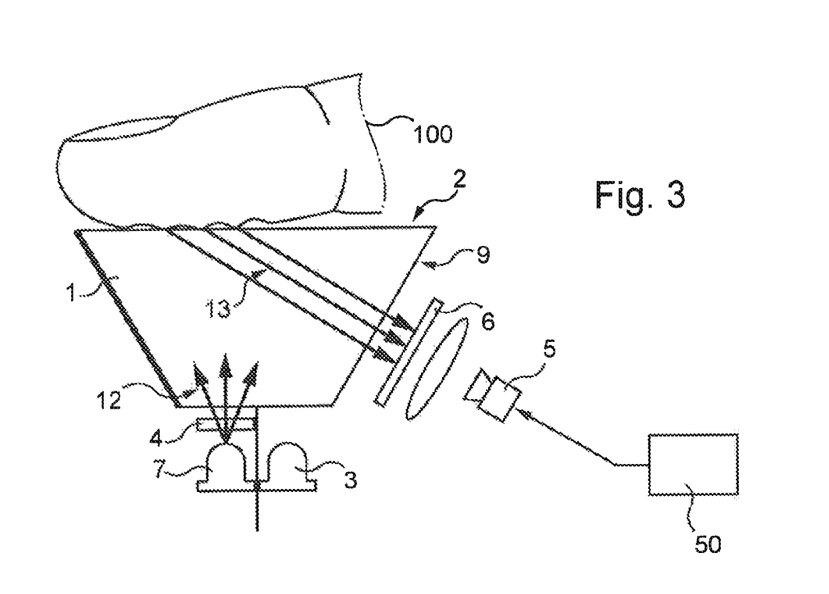

FIGS. 2 and 3 represent a first embodiment of the invention, qualified as a dark-field total internal reflection system for acquiring and analyzing prints. This system comprises a transparent prism 1 having a transparent upper surface 2 on which a finger 100 may be laid; hereinafter, this surface is called transparent reception surface 2. The prism 1 furthermore has a first inclined lateral surface 8 provided with a black screen and a second inclined lateral surface 9 which is an opposite surface to the first lateral surface 8. A camera 5, or other photosensitive image sensor for forming a fingerprint image of the finger 100 laid on the transparent reception surface 2, is arranged facing the second inclined lateral surface 9. A fluorescence detection filter 6 is interposed between the second inclined lateral surface 9 and the camera 5.

The system lastly comprises a first light-emitting diode 3 (illumination source) and a second light-emitting diode 7 (excitation source), both of them arranged under the prism 1 so as to respectively emit an illumination beam 10 (FIG. 2) and an excitation beam 12 (FIG. 3) through the prism 1 towards the finger 100. The light-emitting diode 3 is centered on 525 nm.

The light-emitting diode 7 is centered on 405 nm. The filter 6 is a band-pass filter transmitting 525 nm, that is to say transmitting the illumination spectral band (spectral band of the beam emitted by the light-emitting diode 3). By contrast, the filter 6 is a band-pass filter blocking 405 nm, that is to say blocking the excitation spectral band (spectral band of the beam emitted by the light-emitting diode 7). It is to be noted that a band-pass filter 4 transmitting 405 nm may be interposed between the light-emitting diode 7 and the prism 1 to limit the excitation spectral band.

The system for acquiring and analyzing prints illustrated in FIGS. 2 and 3 operates as follows in the context of a biometric identification method directed at giving access to a right.

In a first phase (see FIG. 2), the camera 5 and the light-emitting diode 3 are used to form a print image of the visible surface of the finger 100. The light-emitting diode 3 is on; it then illuminates the visible surface of the finger 100 through the transparent prism 1, with an angle less than the critical angle of total internal reflection of the glass/air interface. The illumination spectral band for the light-emitting diode 3 is in the transmission zone of the filter 6 situated in front of the camera 5.

At the locations in which the finger 100 is in contact with the transparent reception surface 2 of the prism, that is to say in the peak zones of the visible surface of the finger, the light is back-scattered by the finger, in all directions, since the refractive index of the tissue of the finger is close to the refractive index of the glass. Some of this light is captured by the camera 5. At the locations in which there is no contact between the finger 100 and the transparent reception surface 2, that is to say in the valley zones of the visible surface of the finger 100, the differences in the air/glass indices is an obstacle for the back-scattering of the light in an angle captured by the camera 5. In the valley zones, it is thus the image of the black screen which, by total internal reflection of the surface 2 of the prism, is seen by the camera 5.

Thus, the print image formed by the camera 5 comprises intense pixels, that is to say brilliant (light), corresponding to the peaks of the visible surface of the finger, and dark pixels corresponding to the valleys (or hollows) of the visible surface of the finger. A highly contrasted image is obtained.

In a second phase (see FIG. 3), the camera 5 and the light-emitting diode 7 are used for a spoof detection operation, and more specifically to verify whether the material constituting the finger 100 laid on the transparent reception surface 2 does indeed belong to the class of biological tissues. The light-emitting diode 3 is off and the light-emitting diode 7 is on. The light emitted by the latter, called excitation beam 12, may optionally be filtered by the filter 4 before being directed into the prism to illuminate the visible surface of the finger. The fluorescence beam 13 generated by the tissues of the finger passes through the filter 6 and reaches the camera 5, which filter 6 moreover blocks the direct light from the light-emitting diode 7 and especially the excitation beam reflected by the visible surface of the finger. A fluorescence image is thus formed by the camera 5.

The print image formed in the first part of the method is used to select a region of interest formed by a set of intense pixels of the print image, that is to say a set of pixels corresponding to a useful observation zone of the finger constituted essentially by one or more peak zones in contact with the transparent reception surface 2.

Preferably, the region of interest chosen is the combination of several sub-regions, each of these sub-regions corresponding to a useful observation zone on the finger of very small dimensions, from 1 to 20 mm$^2$, for example of the order of 9 mm$^2$. The interest in selecting a region of interest thus divided (discontinuous) is to obtain a system that is robust to spoofs by juxtaposition, the expression "spoof by juxtaposition" designating a situation in which the object comprises a dummy part and an authentic part.

The level of fluorescence captured by the camera during the second part of the method is summed over the region of the fluorescence image corresponding to the useful observation zone (which encompasses the points of contact with the transparent reception surface 2) that is to say corresponding by ricochet to the region of interest selected in advance in the print image. The fact of summing the fluorescence level over the set of pixels of the region of interest alone makes it possible to reduce the influence of noise and to define a parameter that is truly representative of biological tissues.

If the measured fluorescence level is comprised within the predetermined validity window corresponding to the class of the biological tissues (the fluorescence level summed over a region of the same dimensions in contact with the transparent reception surface, in response to the same excitation beam 12, was measured in advance for a certain number of materials and especially for a certain number of true fingers representative of the population concerned, in order to determine that validity window of which an example 300 can be seen in FIG. 1), the print image formed in the first part of the method is analyzed: it is compared to a bank of print images if it is a matter of identifying the person; is compared to a specific print image corresponding to the person identified in advance, if it is a matter of authenticating that person.

On the other hand, if the fluorescence level measured in the region of interest is situated outside the validity window, the finger 100 is considered as a replica and the right to which the biometric identification should give access is refused.

Figure 4:
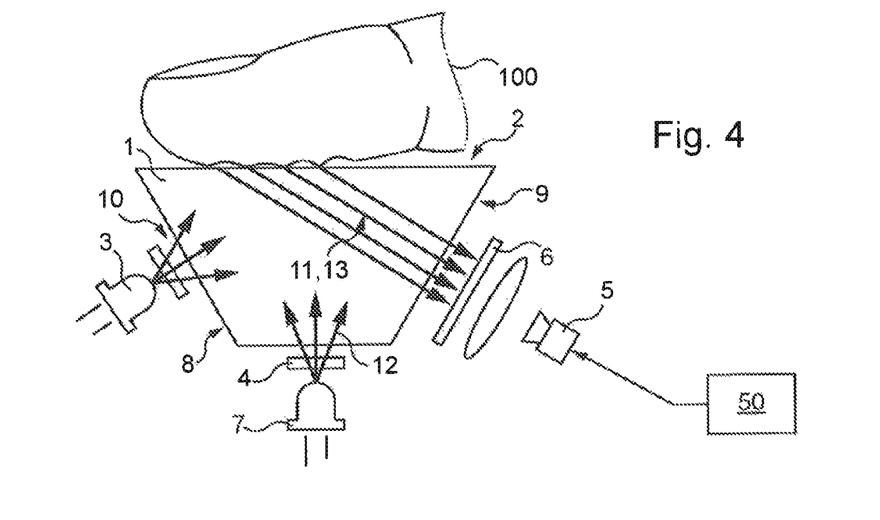
FIG. 4 is a diagrammatic view in elevation of a second embodiment of a system for acquiring and analyzing prints according to the invention, with a bright-field total internal reflection sensor.

FIG. 4 represents a second embodiment qualified as a bright-field total internal reflection system for acquiring and analyzing prints. Identical numerical references to those of FIG. 3 designate the same parts, i.e. a prism 1 with a transparent reception surface 2, a first inclined lateral surface 8, a second inclined lateral surface 9; a light-emitting diode 3 emitting an illumination beam 10 through the prism 1 towards a finger 100 laid on the transparent reception surface 2; a light-emitting diode 7 emitting an excitation beam 12 through the prism 1 towards the finger 100; reflected radiation 11, reflected by the finger when light-emitting diode 3 is on; fluorescence radiation 13, emitted by the finger when light-emitting diode 7 is on; a camera 5 for forming a print image by capture of the reflected radiation 11 and for forming a fluorescence image by capture of the fluorescence radiation 13; a filter 6 associated with the camera 5 suitable for transmitting the illumination spectral band (and thus the reflected radiation 11, for forming the print image) as well as the fluorescence spectral band emitted by the finger in response to the excitation beam 12 and suitable for blocking the excitation spectral band; an optional filter 4 for limiting the excitation beam 12 in terms of excitation spectral band. However, this bright-field total internal reflection embodiment (FIG. 4) differs from the dark-field total internal reflection embodiment (FIGS. 2 and 3) described above in particular in that:

The first inclined lateral surface 8 lacks a black screen; it is therefore transparent.

the light-emitting diode 3 emitting the illumination beam 10 is arranged facing that transparent first inclined lateral surface 8.

As explained above for the dark-field total internal reflection embodiment, a print image is first of all formed by irradiation of the surface of the finger 100 visible through the transparent reception surface 2, using the illumination beam 10 emitted by the light-emitting diode 3, which this time has an angle of incidence greater than the critical angle for total internal reflection of the glass/air interface. In this case, a smaller thickness of air between the glass and the finger, that is to say a valley (or hollow) zone, leads to total internal reflection of the incident beam. On the contrary, in the zones in which the finger 100 is in contact with the transparent reception surface 2, that is to say in a peak zone of the surface of the finger, the light is not reflected since the refractive index of the tissue is close to the refractive index of the glass. Thus, contrary to the dark-field embodiment, the intense (brilliant) pixels of the print image correspond to the valleys (hollows) of the surface of the finger and the dark pixels correspond to the peaks. Here too, a highly contrasted image is obtained. The following part of the method takes place as explained for the dark-field total internal reflection embodiment, with the exception of the fact that the selected region of interest corresponds to dark pixels of the print image (here too, the useful observation zone is a peak zone in contact with the transparent reception surface 2).

Figure 5:
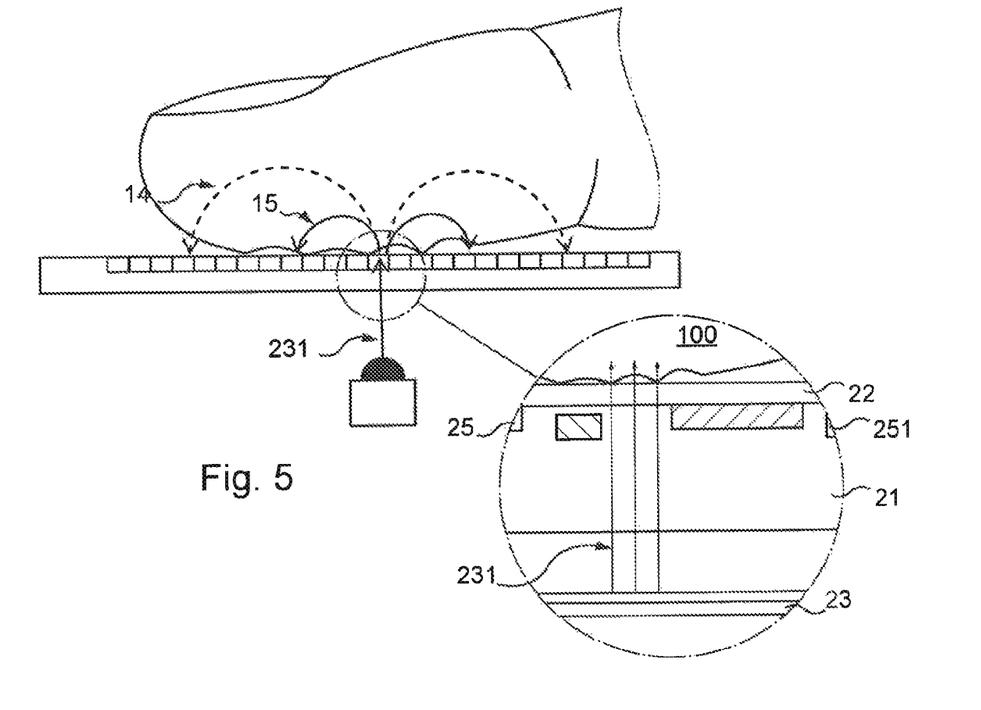
FIG. 5 is a diagrammatic view in elevation of a third embodiment of a system for acquiring and analyzing prints according to the invention, with a TFT flat sensor and used in accordance with the second version of the invention.

FIG. 5 represents a third embodiment of the invention qualified as a system for acquiring and analyzing prints with a TFT sensor, preferably an optical TFT sensor (in addition to an optical sensor, it is possible to use a capacitive or pyroelectric TFT sensor, or a combination of these three). Such a TFT sensor is known, for example, from U.S. Patent Pub. No. 20020054394 or U.S. Patent Pub. No. 2002000915 incorporated herein by reference. This is an image sensor of similar design to a CMOS sensor, produced using the technologies for producing thin film transistors used mainly for manufacturing screens.

Photosensitive pixels 25 (PIN diode, phototransistor of amorphous silicon or of IGZO, etc.) and addressing transistors 251 are distributed in a regular array, with a pitch (between two successive photosensitive elements) which can range from 25 µm to 50 µm, at the surface of a substrate 21 of glass or of quartz or for instance plastic, on condition of being transparent. A transparent protection 22 is applied to this array. This provides a transparent reception surface 2 on which a finger 100 to be imaged may be laid. The protection 22 is thin, that is to say preferably less than the pitch of the photosensitive array, typically less than 50 µm. The matrix is usually of dimensions comprised between 200 and 3000 rows and 250 to 3500 columns according to the size of the object to image. Back-lighting 23 (for example back-lighting by light-emitting diodes (whether or not organic) or a light-emitting film) is provided under the glass substrate 21. It emits a light beam 231 upward that is to say towards the finger 100 through the substrate 21 and the protection 22.

The imaging principle with such a TFT sensor is based on the back-scattering of light through the finger. At the scale of 50 μm, the back-scattering of the light is large for the whole of the visible spectrum. As the finger is illuminated through a matrix with a maximum pitch of 50 μm, it can be considered that it re-emits light practically uniformly. The re-emitted radiation is captured by the photosensitive pixels 25.

The embodiment with a TFT sensor has the advantage of being more compact and cheaper than the two embodiments described above. Furthermore, the image is substantially independent of the illumination color since there is not optics forming the image and thus no problem of chromatic aberration.

However, the contrast is more moderate than with a dark-field total internal reflection sensor. Indeed, on account of the proximity between the light source and the finger, the light passes through the transparent slide with a high number of angles of incidence, and the phenomenon of critical angle of total internal reflection is substantially less marked than with the preceding embodiments. Certain rays, in particular the incident rays of which the angle of incidence is close to the normal relative to the transparent reception surface 2, thus pass through the glass/air interface and reach the valleys of the surface of the finger. In other words, with such a TFT sensor, on account of the angles of incidence of the rays, there is no total internal reflection (this is back-scattering) which means that the peaks appear light while the valleys appear darker, hence a less contrasted image.

Furthermore, it is possible, in particular for the solutions using organic photosensitive elements (organic photodiodes for example) to have control over the spectral domain in which the quantum efficiency is high. It will thus be possible to obtain a much smaller quantum efficiency in the ultraviolet or the violet and a maximum efficiency in the green and/or the red.

The second part of the method, relative to the spoof detection, may be incorporated as described previously in relation to a total internal reflection sensor. In the embodiment, it is possible choose to integrate the excitation sources into the back-lighting 23 or, as a variant, to pass the excitation light through the back-lighting 23 provided back-lighting 23 is used that is free of reflective film on its back face. The region of interest is selected so as to correspond:
  either to intense pixels of the print image, that is to a peak zone, in accordance with the first embodiment of the invention,
  or to less intense or even dark pixels, that is to say to a valley zone, in accordance with the third version of the invention, in particular if the signal at the location of the peak zones is insufficient because the finger is dry. The fact of addressing dark (or rather less intense) pixels, which correspond to valleys, has an advantage since parts of the object are observed which are not in contact with the transparent window. A possible bias linked to the quality of the optical contact between the object and the transparent window is thus avoided. For example, when a finger is humid or greasy, the optical contact is promoted since humidity or grease provides optical coupling. On the contrary, when the finger is dry, the optical coupling between the finger and the window is not optimized. Thus, a zone in contact with the window may generate a different fluorescence signal, at the location of the peaks, depending on whether it is dry or humid. On the contrary, the fluorescence signal corresponding to the valleys is more stable since not influenced by the surface state of the object (dry or humid).
  or a combination of both: both sub-regions are then processed independently of each other, that is to say that two comparisons with different validity windows are successively made.

Each of the embodiments described above may be used according to the following variant (second version of the invention), subject to adapting its excitation source. This version of the invention is illustrated in FIG. 5, with a TFT sensor, it being noted that it may apply to other types of sensor.

A print image (first part of the method) is produced as described above. The second part of the method differs however from what was described above in that the excitation light is projected onto the finger in the form of a pattern, for example a point, a line or some particular shape. It is necessary for the visible surface of the finger to comprise a part not illuminated by the excitation light, complementary to this pattern.

Figure 7:
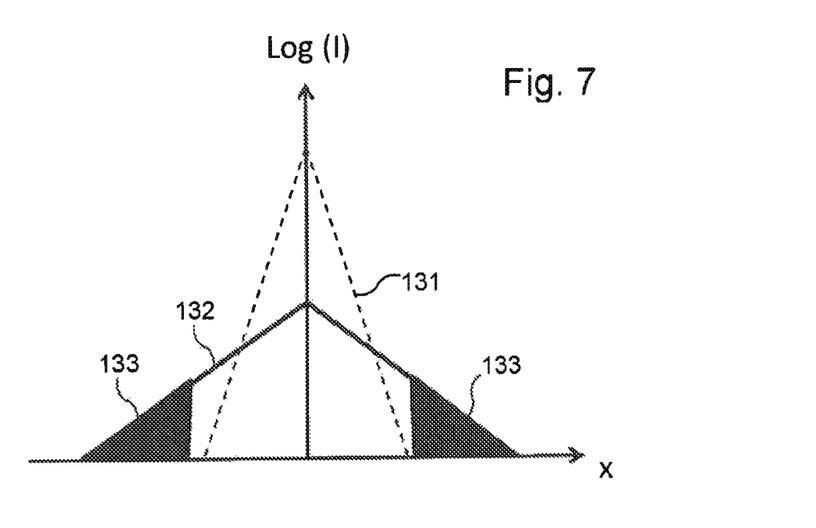
FIG. 7 is a diagrammatic view of the beams received by the TFT sensor of FIG. 5.

A fluorescence image is formed. It is to be noted that the zone on the finger illuminated by the excitation pattern may correspond to a more brilliant region on the fluorescence image since the excitation beam is back-scattered by the finger, this back-scattered excitation beam is however attenuated by the filter 6 before reaching the fluorescence detector. FIG. 7 illustrates rays reaching the fluorescence detector, i.e. an excitation beam 131 back-scattered by the finger and a fluorescence beam 132.

Advantage is then taken of the fact that the excitation light chosen in the ultraviolet (centered on a wavelength less than 450 nm) is absorbed by the tissue (it practically extends beyond the point of impingement of the excitation beam, the back-scattered excitation beam 131 is thus limited to the excitation pattern), whereas the fluorescence light, of longer wavelength, is transmitted (it is thus re-emitted, at least partially, outside the excitation pattern). The fluorescence beam 132 (FIG. 7) comprises rays 15 (see FIG. 5) which have travelled a short distance in the finger relative to the point of impingement of the excitation beam 231, that is to say relative to the point at which the fluorescence is generated, as well as rays 14 which have travelled a greater distance and which are thus attenuated. A region of interest is thus selected which has no intersection with the excitation pattern and which is situated at a distance from the excitation pattern which is greater than a predetermined threshold in order to avoid the corresponding region on the fluorescence image being perturbed by the back-scattered excitation beam 131. This predetermined threshold may, for example, be equal to 0.5 mm or, more generally, correspond to the distance at which the ratio between the intensity of the back-scattered excitation beam 131 and the intensity of the fluorescence beam 132 is equal to 1. Beyond this distance, this ratio is thus less than 1 and the fluorescence beam 1 is predominant. As the region of interest selected (in the print image) is outside the excitation pattern, it corresponds, in the fluorescence image, to one or more measurement regions such as the regions 133 which can be seen in FIG. 7. In this case, a comparison of the fluorescence level at a given distance from the excitation pattern or as a function of the distance relative to the excitation pattern enables a scatter profile of the fluorescence wavelength in the tissue to be translated, which proves to be an indicator characterizing the tissue.

Lastly, the first two embodiments described may be modified by using, instead of and in place of the camera 5, a fluorescence imaging device. In this case, the print image and the fluorescence image are the same. The process is however unchanged.

The invention may be the object of numerous variants in relation to the preferred embodiments described above, provided these variants remain within the scope delimited by the appended claims. Thus for example, the prism of the embodiments with total internal reflection illustrated in FIGS. 3 and 4 may be replaced by a thin slide. In this variant, which has the advantage of being more compact, the print image is obtained after a series of total internal reflections in the glass slide. Another solution, which is also more compact, could consist of using a glass slide of which one face forms a succession of micro-prisms.

The invention claimed is:

1. A method of acquiring and analyzing prints with spoof detection, the method comprising:
   forming a print image of an object facing a transparent reception surface, where the print image is representative of micro-structure of a visible surface of the object,
   irradiating the object through the transparent reception surface with an excitation beam according to an excitation spectral band that forms an excitation pattern on the visible surface of the object,
   analyzing a fluorescence signal emitted by the object in response to the excitation beam, according to a fluorescence spectral band,
   verifying a validity criterion enabling biological tissues to be discriminated from other objects, where the validity criterion is established on the basis of the fluorescence analysis,
   wherein analyzing the fluorescence signal comprises acquiring fluorescence intensity measurements over the whole visible surface of the object and forming a fluorescence image of the object, and
   wherein the method further comprises selecting in the print image a region of interest suitable for characterizing the biological tissues, and wherein the region of interest comprises one of a peak zone of the object in contact with the transparent reception surface, a valley zone, a zone situated at a predetermined distance from the excitation pattern, or at least two zones on the object not having any intersection with the excitation pattern,
   the validity criterion is established solely on the basis of the fluorescence intensity measurements that are relative to a useful observation zone of the object by comparing the fluorescence intensity measurements obtained for the corresponding useful observation zone with a predetermined validity window corresponding to biological tissues.

2. A method of acquiring and analyzing prints with spoof detection, the method comprising:
   forming a print image of an object facing a transparent reception surface, where the print image is representative of micro-structure of a visible surface of the object,
   irradiating the object through the transparent reception surface with an excitation beam according to an excitation spectral band that forms an excitation pattern on the visible surface of the object,
   analyzing a fluorescence signal emitted by the object in response to the excitation beam, according to a fluorescence spectral band,
   verifying a validity criterion enabling biological tissues to be discriminated from other objects, where the validity criterion is established on the basis of the fluorescence analysis,
   wherein analyzing the fluorescence signal comprises acquiring fluorescence intensity measurements over the whole visible surface of the object and forming a fluorescence image of the object, and
   wherein the method further comprises selecting in the print image a region of interest suitable for characterizing the biological tissues and the region of interest is selected such that a corresponding useful observation zone of the object is a peak zone in contact with the transparent reception surface,
   the verification of the validity criterion comprises calculating an average or a sum of the fluorescence intensities measured in the corresponding useful observation zone and comparing the average or sum with a predetermined window of fluorescence intensities corresponding to biological tissues, and
   the validity criterion is established solely on the basis of the fluorescence intensity measurements that are relative to the useful observation zone of the object.

3. The method according to claim 1, wherein the excitation beam has a spectral band centered on a wavelength less than 450 nm, the region of interest in the print image is selected such that is situated at a distance from the excitation pattern starting from which a ratio of the intensity of a back-scattering of the excitation beam and the intensity of a fluorescence beam is less than 1, such that the fluorescence measurements of the corresponding useful observation zone may be considered as not being perturbed by the back-scattering of the excitation beam, and the verification of the validity criterion comprises comparing an average of the fluorescence intensity measurements obtained for the corresponding useful observation zone with the predetermined validity window corresponding to biological tissues.

4. The method according to claim 1, wherein the excitation beam has a spectral band centered on a wavelength less than 450 nm and,
   the region of interest is defined as a first useful observation zone situated at a first predetermined distance from the excitation pattern, which first distance is such that a ratio of the intensity of a back-scattering of the excitation beam and the intensity of a fluorescence beam is less than 1, and a second useful observation zone situated at a second predetermined distance from the excitation pattern, the second distance being greater than the first distance, and
   the verification of the validity criterion comprises establishing a fluorescence decrease profile according to the distance relative to the excitation pattern, using the fluorescence intensities measured for the first and second useful observation zones, and comparing a slope of that decrease profile with the predetermined validity window for fluorescence decrease profile slopes corresponding to biological tissues.

5. The method according to claim 1, wherein the print image and the fluorescence image are one and the same image, and forming the print image and acquiring fluorescence measurements constitute one and the same operation.

6. A system for acquiring and analyzing prints with spoof detection, comprising:
   a transparent reception surface;

a detector that forms a print image of an object facing the transparent reception surface, where the print image is representative of micro-structure of a visible surface of the object;

an excitation light source that produces an excitation beam on an excitation spectral band that forms an excitation pattern on the visible surface of the object, a fluorescence detector for analyzing a fluorescence emitted by the object in response to the excitation beam, emitting on a fluorescence spectral band, a calculator that verifies a validity criterion enabling biological tissues to be discriminated from other objects, where the validity criterion is established on the basis of the fluorescence analysis, wherein the fluorescence detector is suitable for acquiring fluorescence intensity measurements over the whole of the visible surface of the object and for forming a fluorescence image of the object, and the calculator is configured to:

select a region of interest suitable for characterizing the biological tissues on the basis of the print image, wherein the region of interest comprises one of a peak zone of the object in contact with the transparent reception surface, a valley zone, a zone situated at a predetermined distance from the excitation pattern, or at least two zones on the object not having any intersection with the excitation pattern, establish the validity criterion solely on the basis of the fluorescence intensity measurements that are relative to a useful observation zone, wherein the calculator is further configured to compare the fluorescence intensity measurements obtained for the corresponding useful observation zone with a predetermined validity window corresponding to biological tissues.

7. The system according to claim 6, wherein the excitation light source has an excitation spectral band entirely below 500 nm.

8. The system according to claim 6, further comprising a plurality of excitation beams having excitation spectral bands centered on different wavelengths.

9. The system according to claim 6, wherein, the system further comprises an illumination source emitting an illumination beam irradiating the object through the transparent reception surface, according to an illumination spectral band, and the detector that forms a print image comprises a dark-field or light-field total internal reflection sensor configured to measure a beam reflected by the object, or a TFT sensor.

10. The system according to claim 6, further comprising a fluorescence imaging device which serves both as the detector, which forms a fluorescence image, and as the fluorescence detector.

11. The system according to claim 6, wherein the calculator is further configured to:

calculate an average or a sum of the fluorescence intensities measured for the useful observation zone and compare the average or sum with the predetermined validity window delimiting fluorescence intensities corresponding to biological tissues.

12. The system according to claim 6, wherein the detector is a TFT sensor and the calculator is configured to:

calculate an average or a sum of the fluorescence intensities measured for the useful observation zone and compare the average or sum with the predetermined validity window delimiting fluorescence intensities corresponding to biological tissues.

13. The system according to claim 6, wherein, the excitation light source has a spectral band centered on a wavelength below 450 nm, the calculator is further configured to select in the print image, as region of interest, a region not situated at a predetermined distance from the excitation pattern at which the ratio of the intensity of a back-scattering of an excitation beam and an intensity of a fluorescence beam is equal to 1 such that the fluorescence measurements for the corresponding useful observation zone are considered as not being perturbed by the back-scattering of the excitation beam, and the calculator is further configured to compare an average of the fluorescence intensity measurements obtained for the corresponding useful observation zone with the predetermined validity window corresponding to biological tissues.

14. The system according to claim 6, wherein, the excitation light source has a spectral band centered on a wavelength below 450 nm, the calculator is further configured to select in the print image a first useful observation zone situated at a first predetermined distance from the excitation pattern at which the ratio between the intensity of a back-scattering of an excitation beam and an intensity of a fluorescence beam is equal to 1 such that the fluorescence measurements of the first useful observation zone are considered as not being perturbed by a back-scattering of the excitation beam, and a second useful observation zone situated at a second predetermined distance from the excitation pattern, the second distance being greater than the first distance, and the calculator is further configured to establish a fluorescence decrease profile according to the distance relative to the excitation pattern, using the fluorescence intensities measured for the first and second useful observation zones, and compare a slope of that fluorescence decrease profile with the predetermined validity window for fluorescence decrease profile slopes corresponding to biological tissues.

15. The system according to claim 6, wherein the calculator is further configured to perform an additional discrimination step using intensity measurements of the fluorescence emitted in the blue light region by the useful observation zone in response to the excitation beam.

* * * * *